(12) United States Patent
Rochester (10) Patent No.: US 12,392,425 B2
(45) Date of Patent: Aug. 19, 2025

(54) PIPE SUPPORTS AND PIPE SUPPORT KITS

(71) Applicant: Warren Rochester, Sydney (AU)

(72) Inventor: Warren Rochester, Sydney (AU)

( * ) Notice: Subject to any disclaimer, the term of this patent is extended or adjusted under 35 U.S.C. 154(b) by 0 days.

(21) Appl. No.: 18/280,183

(22) PCT Filed: Feb. 28, 2022

(86) PCT No.: PCT/AU2022/050159
§ 371 (c)(1),
(2) Date: Sep. 1, 2023

(87) PCT Pub. No.: WO2022/183237
PCT Pub. Date: Sep. 9, 2022

(65) Prior Publication Data
US 2024/0142023 A1    May 2, 2024

(30) Foreign Application Priority Data
Mar. 3, 2021   (AU) ................. 2021900577

(51) Int. Cl.
*F16L 3/133* (2006.01)
*F16L 3/10* (2006.01)
*F16L 3/11* (2006.01)
*F16L 3/12* (2006.01)

(52) U.S. Cl.
CPC ............. *F16L 3/133* (2013.01); *F16L 3/1091* (2013.01); *F16L 3/11* (2013.01); *F16L 3/1218* (2013.01)

(58) Field of Classification Search
CPC . F16L 3/133; F16L 3/1091; F16L 3/11; F16L 3/1218
See application file for complete search history.

(56) References Cited

U.S. PATENT DOCUMENTS

| | | | |
|---|---|---|---|
| 702,704 A   * | 6/1902 | Carll | |
| 1,579,418 A * | 4/1926 | Tomkinson | ............... F16L 3/11 248/62 |
| 4,166,600 A * | 9/1979 | Perjes | ...................... F16L 3/14 248/62 |

(Continued)

FOREIGN PATENT DOCUMENTS

| AU | 2020103789 A4 * | 2/2021 |
|---|---|---|
| CN | 204328220 U | 5/2015 |

(Continued)

OTHER PUBLICATIONS

Dipa pipe clamp type 130 product online page at https://www.dipa.de/en/product/pipe-clamp-type-130/ dated by archive.org at Oct. 25, 2020 (Year: 2020).*

(Continued)

*Primary Examiner* — Terrell L McKinnon
*Assistant Examiner* — Ding Y Tan
(74) *Attorney, Agent, or Firm* — Kritzer McPhee LLP (57) ABSTRACT

Pipe supports for use in supporting pipework in a building are described, the pipe supports including: a pipe supporting region which in use receives and supports a pipe; an attachment region for attaching the pipe support to a threaded rod to suspend the pipe support from the threaded rod; the attachment region includes a rod receiving aperture; and the rod can be introduced into the aperture by bringing the pipe support towards the rod in a direction that is perpendicular to the length of the rod.

10 Claims, 12 Drawing Sheets

(56) References Cited

U.S. PATENT DOCUMENTS

| | | | | |
|---|---|---|---|---|
| 4,524,935 A * | 6/1985 | Rumble | ............... | F16L 3/133 248/62 |
| 4,934,634 A * | 6/1990 | Breeden, Jr. | ............. | F16L 3/14 248/62 |
| 5,082,216 A * | 1/1992 | Roth | ............... | F16L 3/133 248/62 |
| 5,193,769 A * | 3/1993 | Hofle | ............... | F16L 3/11 248/62 |
| 5,702,077 A * | 12/1997 | Heath | ............... | F16L 3/14 248/62 |
| 6,505,796 B1 | 1/2003 | Roth | | |
| 7,284,728 B2 * | 10/2007 | Connolly | ............ | F16L 3/133 248/62 |
| 8,297,561 B1 * | 10/2012 | Montplaisir | ......... | G01L 5/0052 248/58 |
| 2003/0101662 A1 * | 6/2003 | Ullman | ............ | F24S 25/61 52/27 |
| 2004/0135038 A1 * | 7/2004 | Barton | ............ | F16L 3/14 248/59 |
| 2008/0053008 A1 * | 3/2008 | Ohkoshi | ............ | H02S 20/23 248/237 |
| 2010/0038494 A1 * | 2/2010 | Osborn | ............ | F16L 3/133 248/58 |
| 2010/0314519 A1 * | 12/2010 | Watt | ............ | F16L 3/233 248/274.1 |
| 2018/0375461 A1 * | 12/2018 | Stearns | ............ | F24S 25/636 |
| 2019/0078704 A1 * | 3/2019 | Davidson | ............ | F16L 3/11 |
| 2021/0080032 A1 * | 3/2021 | Belen | ............ | F16L 3/11 |

FOREIGN PATENT DOCUMENTS

| | | | | |
|---|---|---|---|---|
| DE | 4108432 A | * | 9/1992 | ............... F16L 3/14 |
| FR | 2933459 A1 | | 1/2010 | |
| GB | 2320077 A | * | 6/1998 | ............. F16L 3/133 |
| KR | 20160122057 A | | 10/2016 | |

OTHER PUBLICATIONS

Screw thread on Wikipedia, https://en.wikipedia.org/wiki/Screw_thread web.archive.org dated: Oct. 19, 2019 (Year: 2019).*

QRFS blog post #248—A Guide to Top Beam Clamps for Fire Sprinkler and Standpipe Systems, dated Aug. 13, 2019 https://blog.qrfs.com/248-a-guide-to-top-beam-clamps-for-fire-sprinkler-and-standpipe-systems/ (Year: 2019).*

Gibson Stainless and Specialty, Inc Junior stainless steel top beam clamp product page dated Mar. 2018, https://stainlesssteelconduit.gibsonstainless.com/viewitems/stainless-steel-beam-clamps/stainless-steel-junior-top-beam-clamps (Year: 2018).*

* cited by examiner

PRIOR ART

PIPE SUPPORTS AND PIPE SUPPORT KITS

PRIORITY CLAIM

This application claims priority to PCT/AU2022/050159, filed on Feb. 28, 2022, and further claims priority to AU 2021900577, filed on Mar. 3, 2021, the entirety of which are incorporated herein by reference.

TECHNICAL FIELD

The present invention relates to pipe supports and particularly relates to fire rated pipe supports and other components used in pipe support kits.

BACKGROUND TO THE INVENTION

When installing pipework in buildings, such as pipework which forms part of a fire hydrant installation, it is common practice to install the pipework by suspending it from threaded metal rods which have been anchored into the underside of an overhead concrete slab which has been cast as part of the construction phase of the building.

Figure 1:
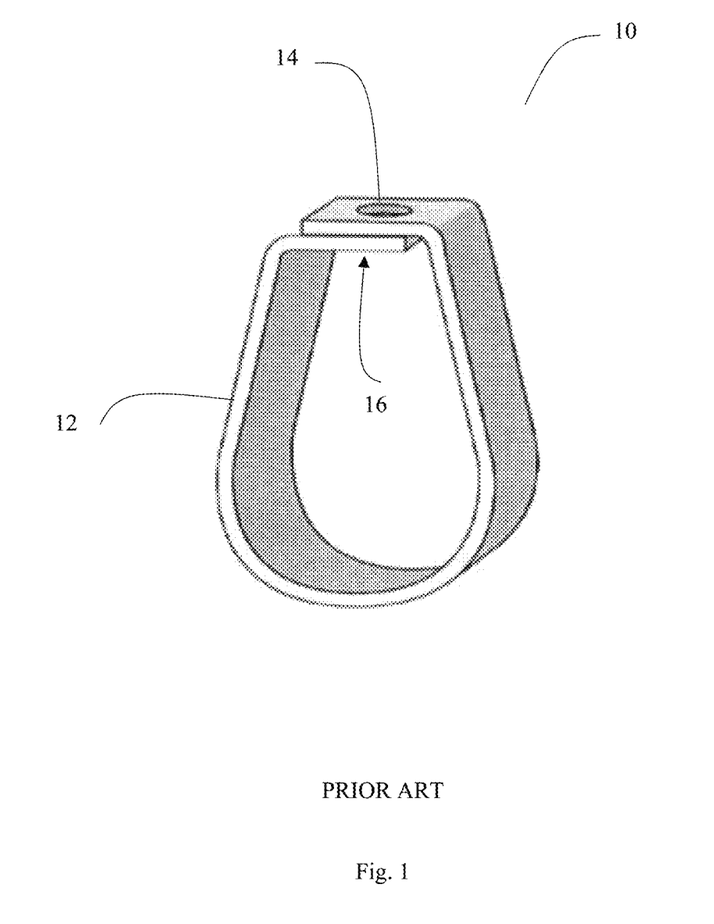
FIG. 1 shows a prior art pear hanger style of pipe support.

To install a section of pipework it is necessary to attach pipe support components to the pipes. The pipe support components are usually proved in the form of pear hangers. Referring to FIG. 1, a typical pear hanger 10 is formed from a band 12 made of metal. Holes 14, 16 are made near to the ends of the band, which is then bent into the shape as shown in FIG. 1. The holes 14, 16 are used to attach the pipe hanger 10 to a threaded rod.

Threaded rods are installed in the ceiling by drilling holes in the concrete and inserting threaded anchors, the rods are then screwed into the anchors. A nut is threaded onto each rod and is wound up the rod. This nut is later used to clamp the pipe support in place.

The pipe supports are passed onto the ends of a section of pipe whilst the pipe is at ground level. The pipe supports are then moved along the pipe to locations on the pipe which will match up to the locations of the threaded rods in the ceiling. The section of pipe fitted with pipe supports is then lifted up to the ceiling, typically using several men with the aid of one or more cherry pickers or other hoisting devices. As the pipe approaches its final installed height, several operations must be carried out simultaneously at each threaded rod as follows:
1. place a flat washer on the end of the rod and lift it part-way up the rod;
2. hold the washer in place whilst the pipe support is aligned and lifted so that the end of the rod passes through the two holes in the pipe support;
3. Place a second washer on the end of the rod, followed by a second nut;
4. Turn the second nut several turns onto the rod.

Only after the second nut has been installed on the rod is it possible to rest the pipe on the pipe support. During all of the operations 1 to 4, the pipe must be maintained in a lifted state, until all of the pipe supports are installed at each threaded rod.

Fine adjustment of the fall of the pipe is then achieved by adjusting the positions of the second nuts in turn, upwards or downwards on the rods to adjust to height of each pipe support at each rod. Once the desired height has been achieved, then the first nut is rotated at each rod to bring it down to clamp the pipe support between the two washers and the two nuts. The nuts are torqued up against one another to secure the pipe support.

The procedure for installing the pipe section comes with some difficulties. The personnel installing the pipe find themselves lifting or supporting the pipe with one hand, and then with the other had manipulating nuts and washers and threading these onto the rod.

The procedure for installing the pipe is often done under poor lighting, and in a confined space. There is a large room for error and components can be dropped or threads crossed when applying these components with one hand. Furthermore, with the heavy pipe being supported during the installation procedure, there is a risk of a strain injury to the operator, or the pipe section could be accidentally dropped.

There remains a need to improve techniques for installing pipework in buildings.

SUMMARY OF THE INVENTION

In a first aspect the present invention provides a pipe support for use in supporting pipework in a building, the pipe support including: a pipe supporting region which in use receives and supports a pipe; an attachment region for attaching the pipe support to a threaded rod to suspend the pipe support from the threaded rod; the attachment region includes a rod receiving aperture; and the rod can be introduced into the aperture by bringing the pipe support towards the rod in a direction that is perpendicular to the length of the rod.

The aperture may be an open-ended slot.

The pipe support may be cast in one piece.

The pipe support may be a two-piece clamp.

In a second aspect the present invention provides a retaining member for retaining a pipe support in association with a threaded rod, the member including: a threaded through hole which in use engages with the threaded rod; an upwardly facing support surface which in use supports a pipe support; and an inwardly facing locating surface which in use traps the pipe support in association with the retaining member.

The retaining member may further include a second inwardly facing locating surface that faces towards the first inwardly facing locating surface.

The retaining member may further include a boss which in use is received in an open-ended slot of the pipe support.

In a third aspect the present invention provides a kit for use in suspending pipework in a building including: a pipe support according to the first aspect of the invention and a retaining member according to the second aspect of the invention.

The kit may further include any one of: a threaded rod; a securing nut; or an anchor.

All of the components of the kit may be formed from stainless steel.

The retaining member and the securing nut may be provided with left-handed threads.

BRIEF DESCRIPTION OF THE DRAWINGS

An embodiment of the present invention will now be described, by way of example only, with reference to the accompanying drawings, in which.

DETAILED DESCRIPTION OF THE PREFERRED EMBODIMENT

Referring to FIGS. 2 to 6, a pipe support assembly kit is shown which includes a pipe support 20, a retaining member 30, a threaded rod 40 and a nut 50. In use the threaded rod is inserted into a threaded anchor 60 (see FIGS. 10 and 11) which has been installed in an overhead concrete slab, but other securing means for the upper and of the rod are possible. All of the parts, the pipe support 20, the retaining member 30, the threaded rod 40, the nut 50 and the threaded anchor are formed from stainless steel. The retaining member 30, the rod 40, the nut 50 and the anchor are formed with left-handed screw threads.

Figure 2:
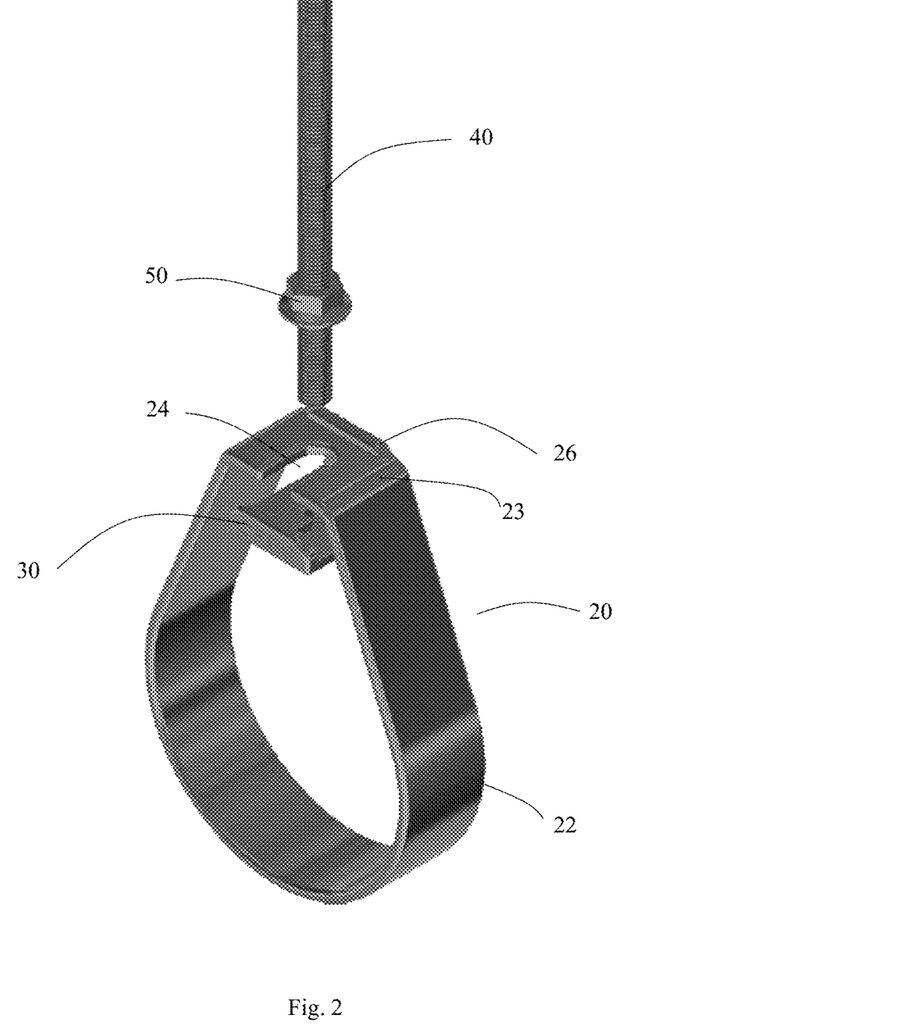
FIG. 2 shows an exploded perspective view of a pipe support kit.
Figure 3:
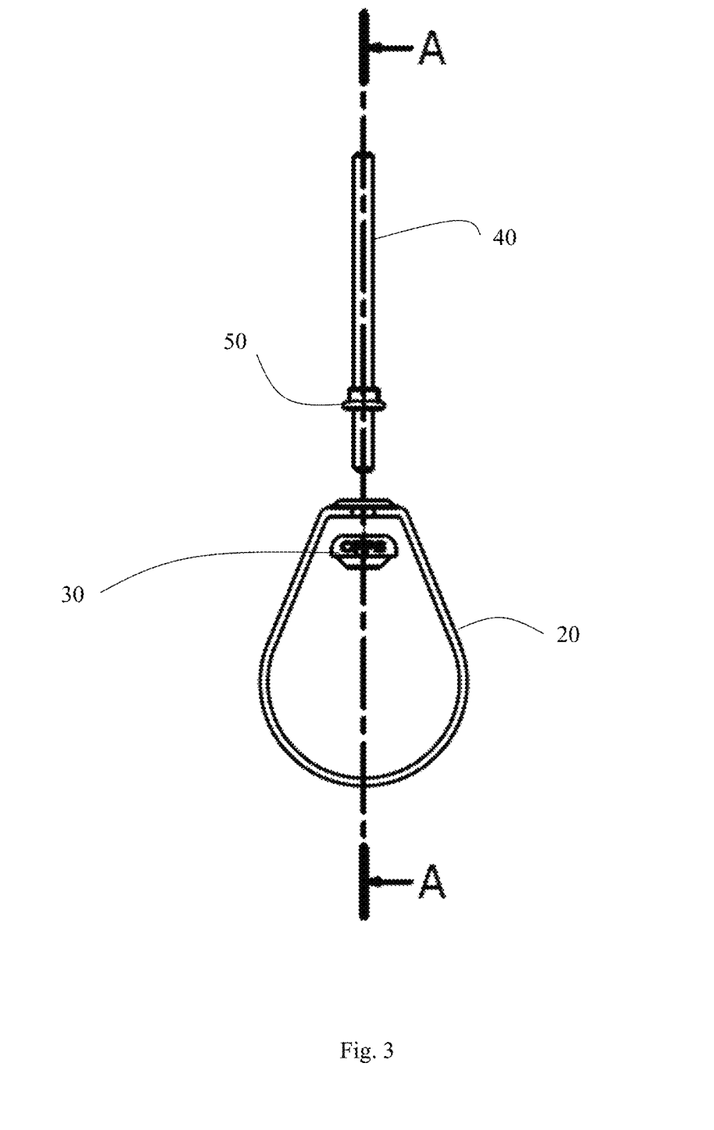
FIG. 3 is a front view of the pipe support kit of FIG. 2.
Figure 4:
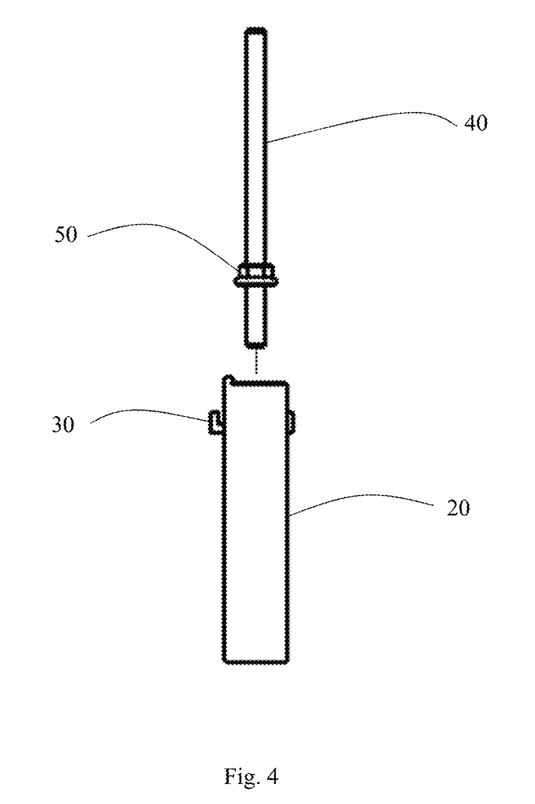
FIG. 4 is a side view of the pipe support kit of FIG. 2.
Figure 5:
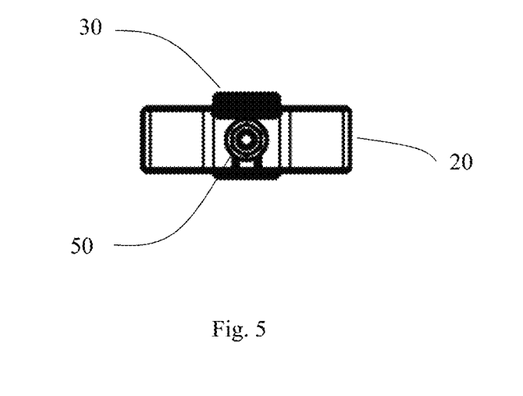
FIG. 5 is a top view of the pipe support kit of FIG. 2.
Figure 6:
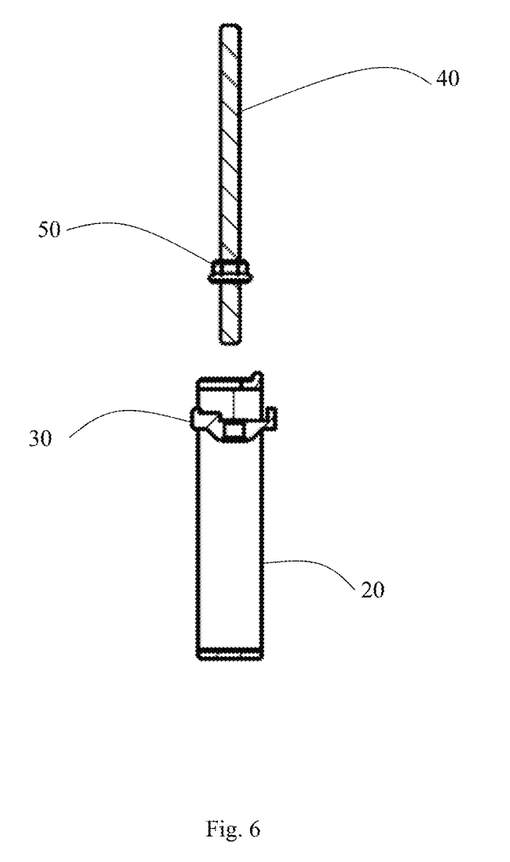
FIG. 6 is a cross sectional view along the line A-A of FIG. 3.

Pipe support 20 is formed by casting it on one piece from stainless steel. The pipe support 20 includes a pipe supporting region 22 which in use receives and supports a pipe, and an attachment region 23 for attaching the pipe support to a threaded rod to suspend the pipe support from the threaded rod. The attachment region includes a rod receiving aperture in the form of open-ended slot 24.

Figure 7:
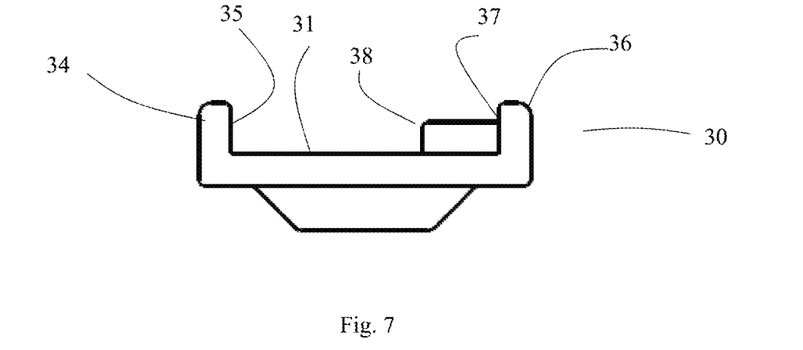
FIG. 7 is a side view of the retaining member of the pipe support kit of FIG. 2.
Figure 8:
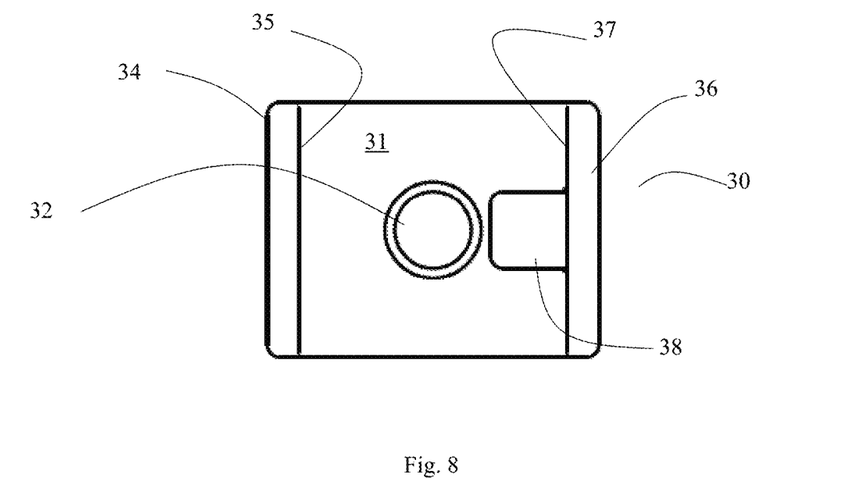
FIG. 8 is a top view of the retaining member of FIG. 7.
Figure 9:
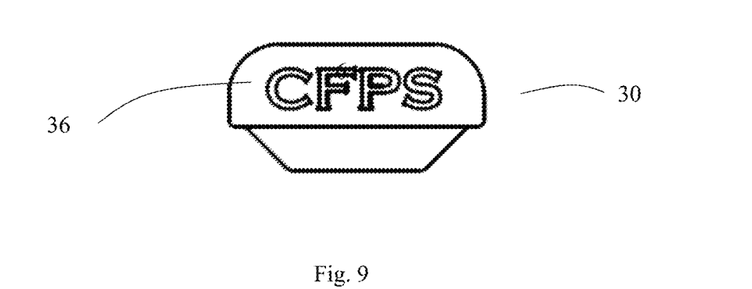
FIG. 9 is a front view of the retaining member of FIG. 7.

A retaining member 30 is used to retain the pipe support in association with threaded rod 40. As best seen in FIGS. 7 to 9, retaining member 30 includes a threaded through hole 32 which in use engages with the threaded rod, an upwardly facing support surface 31 which in use supports the pipe support 20 and includes a raised portion in the form of boss 38. Retaining member also includes a pair of upstanding ribs 34, 36 which have respective inwardly facing locating surfaces 35, 37.

Figure 10:
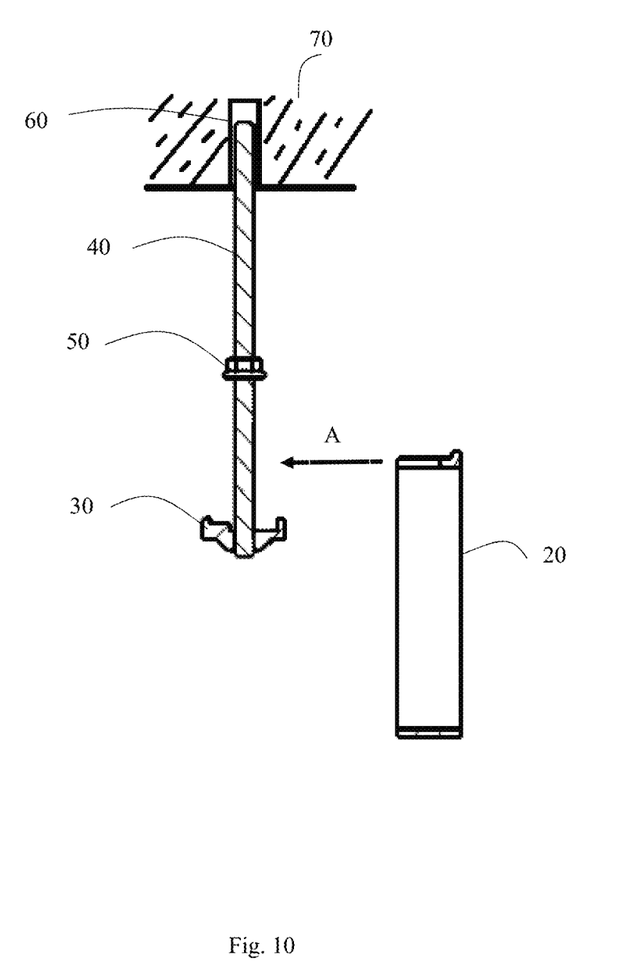
FIGS. 10 and 11 illustrate a sequence of operations for installing the pipe support kit of FIG. 2.
Figure 11:
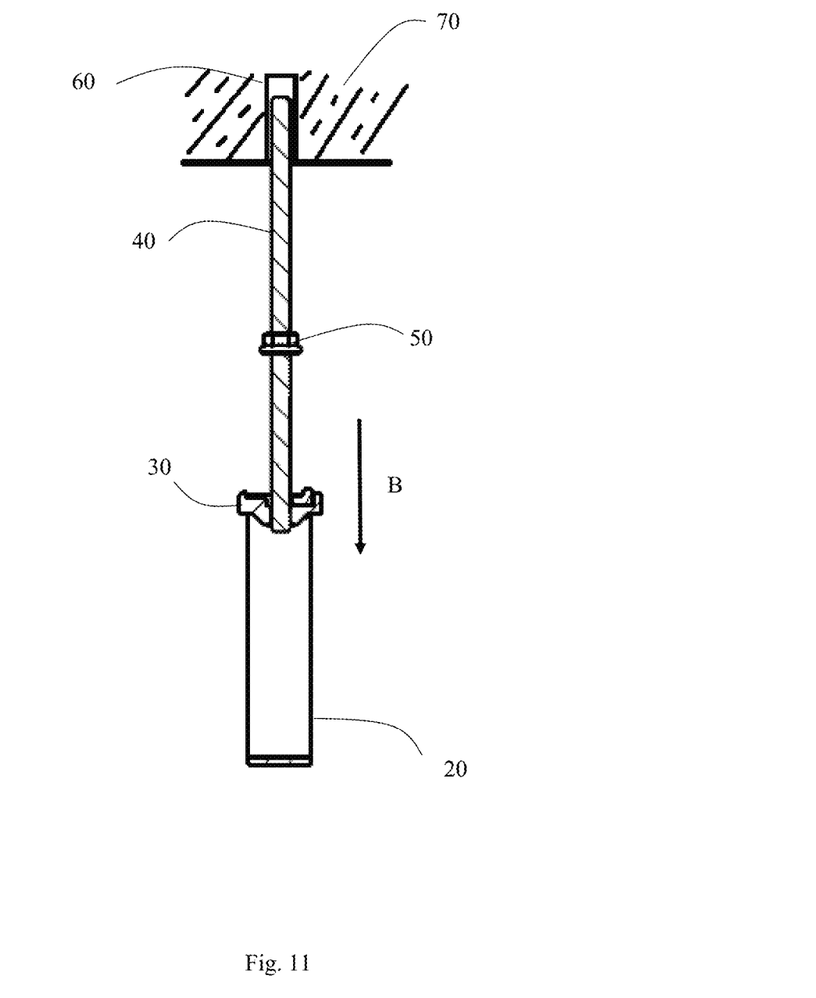

Referring now to FIGS. 10 and 11, the sequence of operations for installing a pipe section using pipe support kits of FIG. 2 will be described. Note that the actual pipe section is omitted from these figures for ease of illustration:

1. Install stainless steel anchors 60 into overhead slab 70 at spaced apart regions of the slab;
2. Insert stainless steel threaded rods 40 of appropriate length into anchors 60;
3. Set up a laser level to shine onto the threaded rods 40 to use as a guide to achieve the correct fall of the pipe section that is to be installed;
4. Thread a retaining member 30 onto each bar, and wind the retaining member up the bar until it reaches the level indicated by the laser sight guide;
5. Pass pipe supports onto the end of the section of pipe to be installed and move them to locations that correspond to the locations of the overhead threaded rods 40;
6. Lift the pipe section up towards the threaded rods 40;
7. As seen at FIG. 10, at each rod 40, move the pipe support 20 sideways as indicated by arrow A, that is, in a direction perpendicular to the length of rod 40, so that the bar 40 is received in the open ended slot 24 of the pipe support 20;
8. As seen at FIG. 11, allow the pipe support to drop downwards as indicated by arrow B to rest the pipe support on the retaining member 30. The underside of the attachment region 23 of the pipe support [22] 20 bears against the support surface 31 of the retaining member and the pipe support 20 is trapped between the locating surface 35 of rib 34 and the threaded rod 40. As well, the locating surface 37 of rib 36 lies alongside and guides the opposite edge of the pipe support, and the boss 38 occupies the open end of slot 24 to achieve a secure location and fit of the pipe support 20 to the retaining member 30.
9. Nut 50 can now be wound down the rod 40 and torqued up against the top surface of the pipe support 20 to finish and secure the assembly. This is repeated at each rod 40 in the installation.

Pipe support kits according to the invention enable a quicker and safer installation procedure when compared to existing solutions. The pipe supports can be simply engaged with the retaining member by moving then to the side to engage the rod, then down to rest on the retaining member. When in this position, the lifting force on the pipe can be released and the pipe is safely suspended from the rod. The securing nut 50 can then be tightened.

Furthermore, after engaging the pipe supports, no further height adjustment is required, this having been set during the earlier step of applying the retaining members 30 to the rods 40.

All components in the pipe support kit can be fabricated from stainless steel to meet fire rating standards. In other embodiments the parts may be fabricated from mild steel or other materials.

The components may all be made of the same colour, and stamped with an identifying mark to indicate to users that they are to be used in the same kit. This prevents the use of non colour-coded parts, such as stray nuts, rods and washers that might be near to hand from accidentally being used in the installation of a fire-rated pipe support.

In the embodiment described above, the threaded components being the anchor, the rod, the nut and the retaining member were provided with a left-handed screw thread. This prevents the use of right handed threaded parts from use with other components of the kit and further guards against the use of non-matching and non-compliant components.

Figure 12:
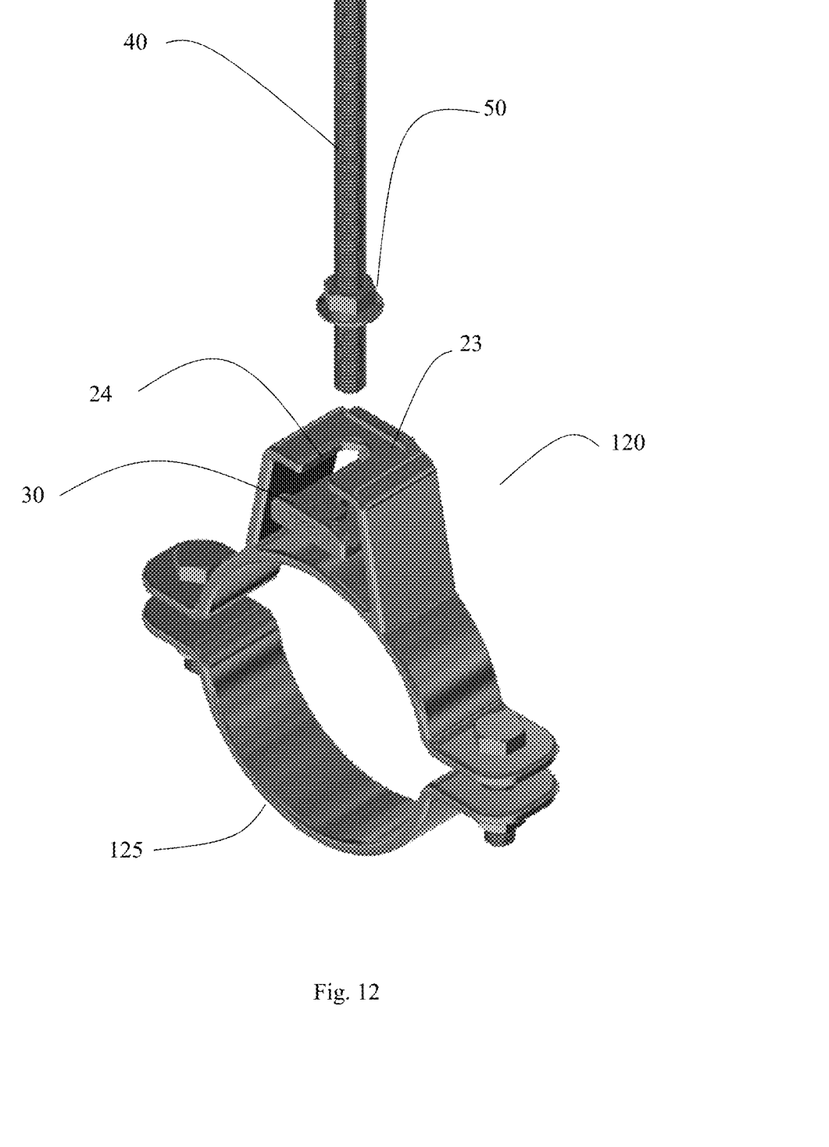
FIG. 12 shows an alternative embodiment of a pipe support kit.

Referring to FIG. 12, an alternative embodiment of a pipe support kit is shown. In this version, the pipe support 120 is in the form of a split clamp style and has a removable lower piece 125. The pipe support has an identical attachment region 23 including the same dimensioned open ended slot 24 as for the first described embodiment and the remaining parts of the kit being retaining member 30, rod 40 and nut 50 are identical and the process of installation is the same as that described above.

Figure 13:
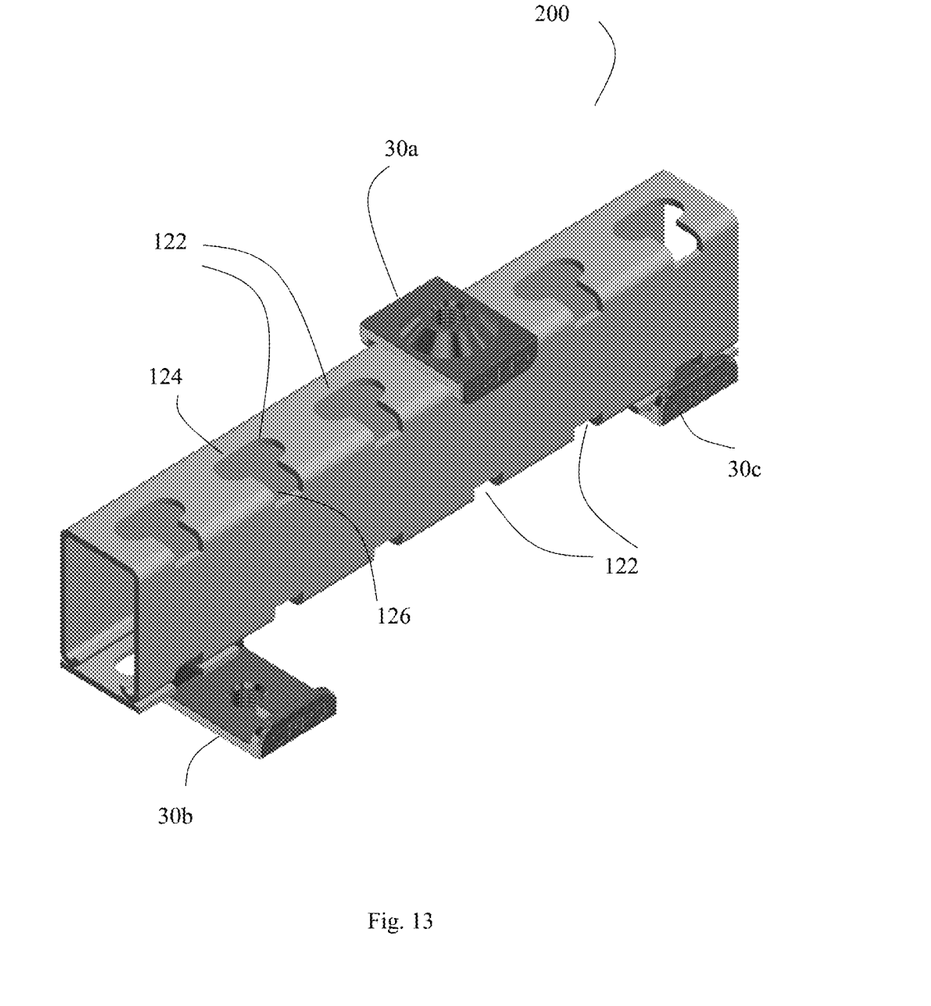
FIG. 13 shows a channel used with retaining members of the pipe support kit shown in FIG. 2.

Referring to FIG. 13, a channel 200 is shown which can be used for installing pipe in a building. Channel 12 is formed from stainless steel and includes a number of identically shaped apertures 122 spaced at regular intervals along its upper and lower surfaces. Each aperture 122 is shaped to include an oval portion 124 and a notched portion 126. Retaining members 30a, b, c are all identical in shape to the retaining member 30 described above. The retaining members fit to the channel by way of the ribs 34, 36 surrounding the outside of the channel whilst the boss 38 keys into the notched portion 126 of aperture 122. Thus, once it has been applied to the channel, the retaining member is prevented from rotating.

As shown in the figure, the retaining members 30*b*, 30*c* can be used with overhead threaded rods to suspend the channel 122 in a building. A threaded rod can then be inserted into retaining member 30*a* and a pipe support can be suspended from it. Other components and pipe supports can later be added to the channel 120.

Figure 14:
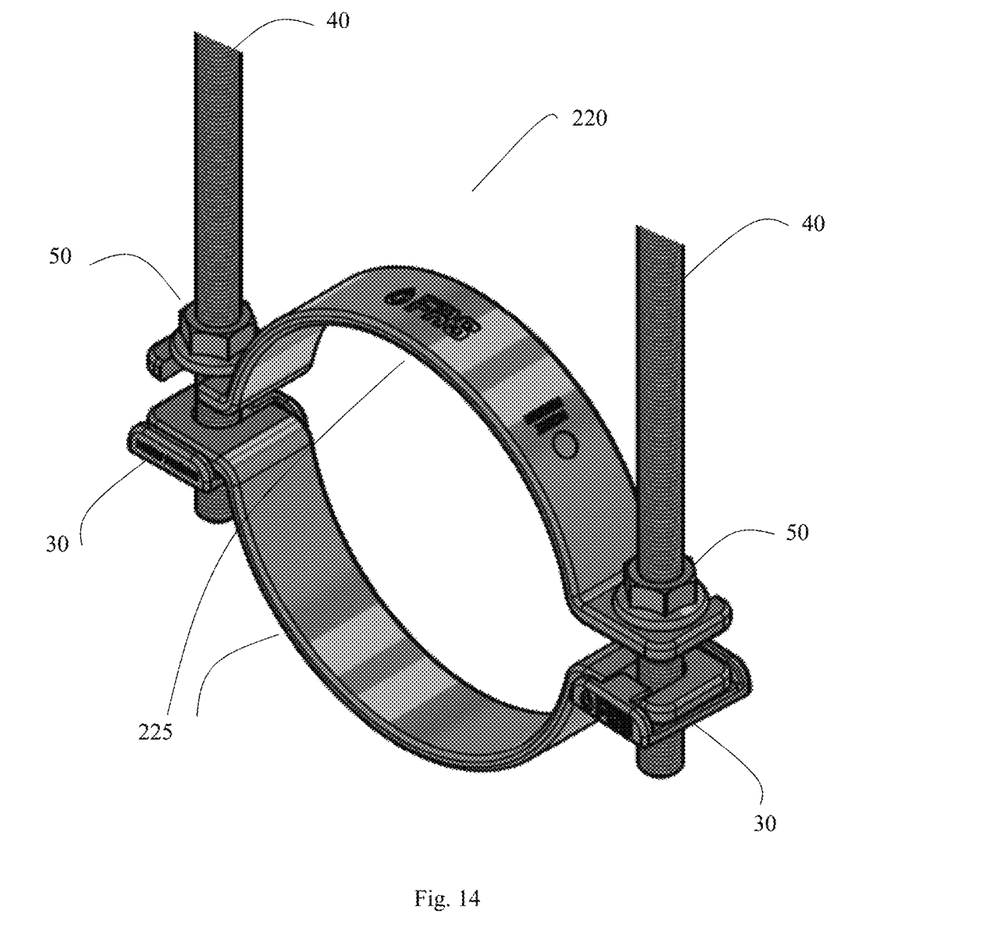
FIGS. 14 and 15 show another embodiment of a pipe support kit.
Figure 15:
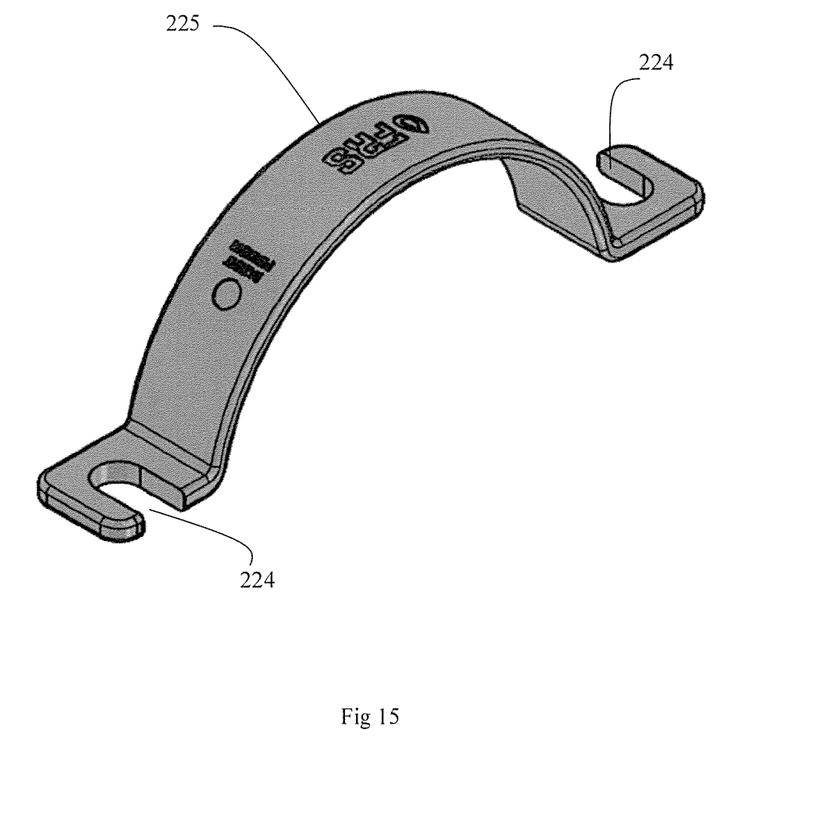

Referring to FIGS. 14 and 15, an alternative embodiment of a split clamp style pipe support kit is shown. In this version, the pipe support 220 is formed from two identical semicircular pieces 225 and attaches to a pair of rods 40. As best seen in FIG. 16, each of the semicircular pieces 225 includes two slots 224. Clamp 220 is particularly useful for replacing pipe supports in an existing installation with new pipe supports and can be installed adjacent to an existing pipe support with the pipe in situ. Clamp 220 is installed by first installing two rods 40, and then attaching nuts 50 and retaining members 30 to the rods as described above. The semicircular pieces are then fitted around the pipe and manipulated so that the rods 40 are brought into the slots 224. Nuts 50 are then tightened to secure the clamp in place. The pre-existing pipe hanger can then be removed.

It can be seen that embodiments of the invention have at least one of the following advantages:

- The process of engaging a pipe support with an overhead threaded rod is quick and easy to achieve, thereby reducing the time that a pipe must be supported. Installation time is reduced, along with the risk of injury and damage.
- Coded and matched components reduce risk of non-compliant components being used in a fire-rated hydrant installation.
- Attachment technique can be used with a wide range of types and sizes of pipe supports and related hardware.

Any reference to prior art contained herein is not to be taken as an admission that the information is common general knowledge, unless otherwise indicated.

Finally, it is to be appreciated that various alterations or additions may be made to the parts previously described without departing from the spirit or ambit of the present invention.

The invention claimed is:

1. A kit for use in suspending pipework in a building, the kit comprising:
    a pipe support;
    a retaining member comprising:
        a threaded through hole configured to engage a threaded rod;
        an upwardly facing support surface configured to support the pipe support; and
        a first inwardly facing locating surface configured to trap the pipe support in association with the retaining member;
        a second inwardly facing locating surface that face towards the first inwardly facing locating surface; and
        a boss configured to be received in an open-ended slot of the pipe support; and
    the pipe support comprising:
        a pipe supporting region configured to receive and support a pipe; and
        an attachment region for attaching the pipe support to a threaded rod to suspend the pipe support from the threaded rod;
    wherein the attachment region comprises a rod receiving aperture in the form of an open-ended slot; and
    wherein the threaded rod can be introduced into the rod receiving aperture by bringing the pipe support towards the threaded rod in a direction that is perpendicular to the length of the threaded rod.

2. A kit according to claim 1 wherein each of the retaining member and the pipe support are formed from stainless steel.

3. A kit according to claim 1, further comprising a threaded rod.

4. A kit according to claim 3 wherein each of the retaining member, the pipe support, and the threaded rod are formed from stainless steel.

5. A kit according to claim 1, further comprising a securing nut.

6. A kit according to claim 5, wherein each of the retaining member, the pipe support, and the securing nut are formed from stainless steel.

7. A kit according to claim 5, wherein the retaining member and the securing nut are provided with left-handed threads.

8. A kit according to claim 6, wherein the retaining member and the securing nut are provided with left-handed threads.

9. A kit according to claim 1, further comprising an anchor.

10. A kit according to claim 9 wherein each of the retaining member, the pipe support, and the anchor are formed from stainless steel.

* * * * *